United States Patent [19]

Kerth et al.

[11] Patent Number: 5,618,895
[45] Date of Patent: Apr. 8, 1997

[54] PROCESS FOR PREPARING COPOLYMERS OF PROPYLENE WITH OTHER 1-ALKENES

[75] Inventors: Juergen Kerth, Carlsberg; Peter Koelle, Ludwigshafen; Ralf Zolk, Weisenheim; Harald Schwager, Speyer, all of Germany

[73] Assignee: BASF Aktiengesellschaft, Ludwigshafen, Germany

[21] Appl. No.: 121,465

[22] Filed: Sep. 16, 1993

Related U.S. Application Data

[63] Continuation-in-part of Ser. No. 943,152, Sep. 10, 1992, abandoned, which is a continuation of Ser. No. 672,283, Mar. 20, 1991, abandoned.

[30] Foreign Application Priority Data

Apr. 6, 1990 [DE] Germany ............... 40 11 160.1

[51] Int. Cl.⁶ ............... C08F 4/648; C08F 2/34; C08F 210/06
[52] U.S. Cl. ............... 526/128; 526/124.6; 526/129; 526/156; 526/348; 526/348.6; 526/901; 526/916
[58] Field of Search ............... 526/124.6, 128, 526/129, 348, 348.6, 901, 156

[56] References Cited

U.S. PATENT DOCUMENTS

| 4,260,710 | 4/1981 | Staiger et al. |
| 4,351,930 | 9/1982 | Patnaik. |
| 4,483,971 | 11/1984 | Sato et al. ............... 526/348.6 X |
| 4,721,763 | 1/1988 | Bailly et al. ............... 526/901 X |

FOREIGN PATENT DOCUMENTS

| 0120503 | 3/1984 | European Pat. Off. . |
| 8403888 | 10/1984 | WIPO ............... 526/901 |

*Primary Examiner*—Fred Teskin
*Attorney, Agent, or Firm*—Keil & Weinkauf

[57] ABSTRACT

Copolymers of propylene with other 1-alkenes, obtainable by gas-phase polymerization of a mixture of propylene and another 1-alkene in the absence of a liquid reaction medium under a pressure of from 15 to 30 bar, at from 60° to 90° C. and with an average holdup time of the polymer of from 1 to 5 hours, with the aid of a Ziegler-Natta catalyst system which, besides a titanium-containing solid component, contains an aluminum component and an electron donor, with the temperature being chosen so that, under the preset pressure, no condensation of the monomer mixture takes place in the gas space and, moreover, the ratio of the partial pressures of propylene and the other 1-alkene is adjusted to from 5:1 to 100:1, are particularly suitable for producing sheets and shaped articles.

5 Claims, No Drawings

PROCESS FOR PREPARING COPOLYMERS OF PROPYLENE WITH OTHER 1-ALKENES

This application is a CIP of application Ser. No. 07/943,152, filed on Sep. 10, 1992 now abandoned which is a Continuation of Ser. No. 07/672,283, filed on Mar. 20, 1991 now abandoned.

The present invention relates to copolymers of propylene with other 1-alkenes which are obtainable by gas-phase polymerization of a mixture of propylene and other 1-alkenes in the absence of a liquid reaction medium under a pressure of from 15 to 30 bar, at from 60° to 90° C. and with an average holdup time of the polymer of from 1 to 5 hours, with the aid of a Ziegler-Natta catalyst system which, besides a titanium-containing solid component, contains an aluminum component and an electron donor, with the temperature being chosen so that, under the preset pressure, no condensation of the monomer mixture takes place in the gas space and, moreover, the ratio of the partial pressures of propylene and the other 1-alkenes is adjusted to from 5:1 to 100:1.

The present invention also relates to a process for preparing these copolymers and to sheets and shaped articles composed of these copolymers.

The preparation of propylene copolymers by Ziegler-Natta polymerization has been described many times. The catalyst components used for this contain, among other things, compounds of multivalent titanium, aluminum halides and/or alkyls, plus electron donors, those used most often being silanes, esters, ethers, ketones or lactones (EP-B 14,523, EP-B 45,977, EP-B 86,473, EP-A 171,200).

Processes for preparing propylene/ethylene block copolymers with the aid of Ziegler-Natta catalyst systems have also been disclosed (U.S. Pat. No. 4,454,299, U.S. Pat. No. 4,455,405, ZA-B 0084/3561, ZA-B 0084/3563, ZA-B 0084/5261, GB-B 1,032,945) and entail initial polymerization of gaseous propylene in a first reaction zone and subsequent transfer of the resulting homopolymer into a second reaction zone where a mixture of ethylene and propylene is additionally polymerized. The process is usually carried out under elevated pressure and in the presence of hydrogen as molecular weight regulator. The copolymers obtained thereby usually have an excellent impact strength but the process design is relatively elaborate because the polymerization is carried out in two reactors in series, which necessitates appropriate control.

Furthermore, U.S. Pat. No. 4,260,710 discloses a process for the preparation of homo- and copolymers of 1-alkenes by gas-phase polymerization with the aid of Ziegler-Natta catalysts in an agitator vessel. This process can be used to prepare, in particular, polypropylenes with high stereospecificity, although the productivity of the catalyst, which indicates the ratio between the amount of polymer obtained and the amount of catalyst employed, is still capable of improvement.

In addition, for some applications, it is necessary to reduce the content of undesired catalyst residues, especially chlorine, in the resulting copolymer so that such materials can also be used for purposes in which they come into contact with substances which are at risk of corrosion. The use of propylene copolymers in the foodstuffs sector furthermore makes it necessary to minimize the content of xylene-soluble substances in the polymer.

It is an object of the present invention to remedy the disadvantages which have been described and to develop propylene copolymers with improved industrial use properties. Among the improved industrial use properties characterizing the terpolymers of the instant application are a lower melting point and a lower heat seal temperature, which means that they can be processed at lower temperatures, for example in extruders, so that energy costs can be reduced.

We have found that this object is achieved by the novel propylene copolymers defined in the first paragraph.

The process generating these copolymers can be carried out in conventional reactors used for propylene polymerization, either batchwise or, preferably, continuously. Suitable reactors are, inter alia, continuously operated agitator vessels which contain a fixed bed of finely divided polymer, preferably polypropylene, which is normally kept in motion by suitable agitators.

The polymerization is carried out in the absence of a liquid reaction medium in the gas phase under a pressure of from 15 to 30 bar, at from 60° to 90° C. and with an average holdup time of the polymer of from 1 to 5 hours. Preferred conditions are pressures of from 20 to 30 bar, temperatures of from 65° to 80° C. and average holdup times of from 1.5 to 4 hours. Care should also be taken, by suitable choice of the appropriate reaction parameters, that from 0.05 to 2 kg, preferably 0.1 to 1.5 kg, of polypropylene are formed in the polymerization per mmol of the aluminum component in the Ziegler-Natta catalyst system.

The process can be carried out with conventional Ziegler-Natta catalysts for polymerization. These contain an aluminum component and an electron donor in addition to a titanium-containing solid component and other items.

The titanium-containing solid component is generally prepared using halides or alcoholates of trivalent or tetravalent titanium, and titanium chlorides, especially titanium tetrachloride, are preferred. The titanium-containing solid component is usually applied to a very finely divided carrier, suitable for this being silicas, aluminas and aluminum silicates of the formula $SiO_2 \cdot aAl_2O_3$ where a is from 0.01 to 2, in particular from 0.01 to 0.5.

The carriers which are preferably used have a particle diameter of from 0.1 to 1000 μm, in particular from 10 to 300 μm, a pore volume of from 0.1 to 10 cm$^3$/g, in particular from 1.0 to 5.0 cm$^3$/g, and a specific surface area of from 10 to 1000 m$^2$/g, in particular from 100 to 500 m$^2$/g.

The titanium-containing solid component also contains, inter alia, magnesium compounds. Suitable besides magnesium halides, alkyls and aryls are alkoxy and aryloxy compounds of magnesium, those particularly used being magnesium dichloride, dibromide and di-($C_1$–$C_{10}$-alkyl) compounds. The titanium-containing solid component also contains a halogen, preferably chlorine or bromine.

Besides the trivalent or tetravalent titanium compounds, the carrier, the magnesium compound and the halogen, the titanium-containing solid component also contains electron donors, for example mono- or polyfunctional carboxylic acids, anhydrides and esters, also ketones, ethers, alcohols, lactones and organophosphorus and -silicon compounds. Preferred electron donors in the titanium-containing solid component are phthalic acid derivatives of the formula I

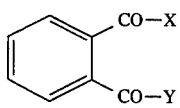

where X and Y are each chlorine or $C_1$–$C_{10}$-alkoxy or together are oxygen. Particularly preferred electron donors are phthalic esters, in which case X and Y are each $C_1$–$C_8$-alkoxy, for example methoxy, ethoxy, propoxy or butoxy.

Further preferred electron donors in the titanium-containing solid component are, inter alia, diesters of 3- or 4-membered cycloalkane-1,2-dicarboxylic acids which may be substituted, and monoesters of benzophenone-2-carboxylic acids which may be substituted. The esterification reactions for producing these esters are carried out with the usual alcohols, inter alia $C_1$–$C_{15}$-alkanols, $C_5$–$C_7$-cycloalkanols, each of which can carry $C_1$–$C_{10}$-alkyl groups, and phenols, naphthols and the $C_1$–$C_{10}$-alkyl derivatives of these compounds.

The titanium-containing solid component can be prepared by conventional methods. Examples are given in EP-A 45 975, EP-A 45 977, EP-A 86 473, EP-A 171 200 and GB-A 2,111,066, inter alia.

The following two-stage process is preferably used to prepare the titanium-containing solid component.

In the first stage, a finely divided carrier, preferably silica or $SiO_2 \cdot aAl_2O_3$ where a is from 0.01 to 2, in particular from 0.01 to 0.5, is stirred with a solution of a magnesium compound in a liquid alkane at from 10° to 120° C. for from 0.5 to 5 hours. Preferably from 0.1 to 1 mole of the magnesium compound is employed per mole of the carrier. Subsequently, while continuing stirring, a halogen or a hydrogen halide, especially chlorine or hydrogen chloride, is added in an at least two-fold, preferably in an at least five-fold, molar excess based on the magnesium compound. Then a $C_1$–$C_8$-alkanol, in particular ethanol, a halide or an alcoholate of trivalent or tetravalent titanium, especially titanium tetrachloride, and an electron donor, especially a phthalic acid derivative of the formula I, are added. The amounts used per mole of magnesium compound in the solid obtained from the first stage are from 1 to 5 moles, in particular 2 to 4 moles, of alkanol, from 2 to 20 moles, in particular 4 to 10 moles, of the trivalent or tetravalent titanium compound and from 0.01 to 1 mole, in particular 0.1 to 1.0 mole, of the electron donor. The solution is stirred at from 10° to 150° C. for at least one hour, and the resulting solid is then filtered off and washed with a liquid alkane, preferably hexane or heptane.

In the second stage, the solid obtained in the first stage is extracted with excess titanium tetrachloride, either as such or in solution in an inert solvent, preferably an alkylbenzene, in which case the solution contains not less than 5% by weight titanium tetrachloride, at from 100° to 150° C. for some hours. The product is then washed with a liquid alkane until the washings contain less than 2% by weight titanium tetrachloride.

Suitable aluminum components are, besides trialkylaluminum, those compounds in which one alkyl has been replaced by alkoxy or halogen such as chlorine or bromine. Preferred trialkylaluminum compounds are those in which each of the substituents has from 1 to 8 carbon atoms, for example trimethyl-, triethyl- or methyldiethylaluminum.

Besides the titanium-containing solid component and the aluminum component, the catalyst systems according to the invention contain as additional independent catalyst component electron donors such as mono- or polyfunctional carboxylic acids, anhydrides and esters, also ketones, ethers, alcohols, lactones and organophosphorus and -silicon compounds. Preferred electron donors are organosilicon compounds of the formula II

$R^1{}_n Si(OR^2)_{4-n}$  II, where $R^1$ is $C_1$–$C_{20}$-alkyl, 5- to 7-membered cycloalkyl which can carry a $C_1$–$C_{10}$-alkyl, or $C_6$–$C_{20}$-aryl or -arylalkyl, $R^2$ is $C_1$–$C_{20}$-alkyl, and n is 1 to 3. Particularly preferred compounds are those where $R^1$ is $C_1$–$C_8$-alkyl or 5- to 7-membered cycloalkyl, $R^2$ is $C_1$–$C_4$-alkyl and n is 1 or 2.

Especially preferred compounds are dimethoxydiisopropylsilane, dimethoxydisobutylisopropylsilane, dimethoxydiisobutylsilane, dimethoxydicyclopentylsilane and diethoxyisobutylisopropylsilane.

Catalyst systems which are preferably used are those in which the atomic ratio between aluminum from the aluminum component and titanium from the titanium-containing solid component is from 10:1 to 800:1, in particular 20:1 to 200:1, and the molar ratio between the aluminum component and the electron donor is from 1:1 to 100:1, in particular 2:1 to 80:1. The individual catalyst constituents can be introduced into the polymerization system in any desired sequence, singly or as mixture of two components.

This Ziegler-Natta catalyst system is used in the process leading to the copolymers according to the invention to polymerize a mixture of propylene and other 1-alkenes. For the purposes of the present invention these are $C_2$–$C_{10}$-1-alkenes, in particular ethylene, 1-butene, 1-pentene, 1-hexene, 1-heptene and 1-octene, with ethylene and 1-butene being preferred. It is also possible, for the preparation of specific copolymers, to use a mixture of ethylene and a $C_4$–$C_{10}$-1-alkene, in which case the partial pressure ratio between ethylene and the $C_4$–$C_{10}$-1-alkene should be adjusted to from 1:1 to 100:1, in particular from 2:1 to 80:1.

According to the invention, under the preset pressure of from 15 to 30 bar, the temperature should be chosen in each case to be sufficiently high for no condensation of the monomer mixture to take place in the gas space. In this connection, the temperature depends not only on the prevailing pressure but also on the dew points of the 1-alkenes used and therefore should be determined by some preliminary experiments for each polymerization system. In addition, care must be taken that the ratio of the partial pressures of propylene and the other 1-alkenes is in the range from 5:1 to 100:1, in particular from 5:1 to 50:1. Since this proviso depends, inter alia, on the nature of the 1-alkenes, the appropriate reaction parameters within the preset limits should also be determined by preliminary experiments.

The molecular weight of the resulting polymers can be controlled in a conventional manner by the addition of regulators, in particular of hydrogen. It is also possible to use inert gases such as nitrogen or argon in addition.

The copolymers obtainable by the process according to the invention have a random monomer distribution with mean molecular weights of from 10,000 to 500,000 and melt flow indices of from 0.1 to 100 g/10 min, preferably from 0.2 to 10 g/10 min, in each case measured by the DIN 53 735 method at 230° C. and 2.16 kg. The melt flow index is the amount of polymer which is expelled within 10 minutes at 230° C. under a load of 2.16 kg from the test apparatus specified in DIN 53 735. The process makes it possible to prepare propylene copolymers with high productivity. The resulting copolymers contain only small amounts of xylene-soluble substances and chlorine.

These properties mean that such copolymers are suitable, inter alia, for producing sheeting for the foodstuffs sector, also tubes, coatings, filaments, hollow articles, injection molded articles and shaped components for automobiles.

EXAMPLES

All the Examples were carried out in a vertically agitated gas-phase reactor with an effective volume of 800 l in the presence of hydrogen as molecular weight regulator. The reactor contained an agitated fixed bed of finely divided polymer. The polymer output from the reactor was 85 kg of polypropylene per hour in all the Examples.

EXAMPLE 1

A gaseous mixture of propylene and ethylene was injected into the gas-phase reactor at 70° C. and under 23 bar, with the ratio between the propylene and ethylene partial pressures being 25:1. This mixture was continuously polymerized with the aid of a Ziegler-Natta catalyst with an average holdup time of 2.5 hours, using 2.2 g of a titanium-containing solid component, 255 mmol of triethylaluminum and 25 mmol of dimethoxyisobutylisopropylsilane as catalyst constituents per hour. 0.3 kg of propylene copolymer was produced per mmol of aluminum component.

The product from the gas-phase polymerization was a propylene/ethylene copolymer with a melt flow index of 2.5 g/10 min at 230° C. and 2.16 kg (DIN 53 735 method). The polymerized ethylene content was 4.2% by weight. The productivity of the catalyst and the contents of chlorine and xylene-soluble substances in the propylene/ethylene copolymer according to the invention are to be found in the Table which follows.

The titanium-containing solid component was prepared by the following process:

In a first stage, $SiO_2$ which had a particle diameter of from 20 to 45 μm, a pore volume of 1.75 $cm^3/g$ and a surface area of 320 $m^2/g$ was mixed with butyl-(octyl)magnesium dissolved in n-heptane, employing 0.25 mol of the magnesium compound per mol of $SiO_2$. The mixture was stirred at 90° C. for 1.5 hours, then cooled to 20° C. and 10 times the molar amount, based on the organo-magnesium compound, of hydrogen chloride was passed in.

Then, while stirring continuously, 3 mol of ethanol per mol of magnesium compound were added. The solution was stirred at 80° C. for 1.5 hours and then 6 mol of titanium tetrachloride and 0.5 mol of di-n-butyl phthalate per 1 mol of magnesium compound were added. The mixture was stirred for a further two hours and then filtered with suction to remove the solid.

The resulting product was extracted with a 15 per cent by weight solution of titanium tetrachloride in ethylbenzene at 125° C. for two hours. The solid was then filtered off from the extractant and then washed with n-heptane until the washings contained only 0.3% by weight titanium tetrachloride.

The resulting titanium-containing solid component contained 3.1% by weight titanium, 6.3% by weight magnesium and 24.8% by weight chlorine.

EXAMPLE 2

The same catalyst system and conditions of Example 1, but at 80° C., were used to prepare a propylene/ ethylene copolymer which had a melt flow index of 2.5 g/ 10 min at 230° C. and 2.16 kg (DIN 53 735 method). The polymerized ethylene content was 4.1% by weight. The productivity of the catalyst and the contents of chlorine and xylene-soluble substances in the propylene/ethylene copolymer according to the invention are to be found in the Table which follows.

EXAMPLE 3

The same catalyst system and conditions as described in Example 1 were used to polymerize a gaseous mixture of propylene and 1-butene, the ratio between the propylene and 1-butene partial pressures being 25:1.

The product from the gas-phase polymerization was a propylene/1-butene copolymer with a melt flow index of 11 g/10 min at 230° C. and 2.16 kg (DIN 53 735 method). The polymerized 1-butene content was 5.1% by weight. The productivity of the catalyst and the contents of chlorine and xylene-soluble substances in the propylene/1-butene copolymer according to the invention are to be found in the Table which follows.

EXAMPLE 4

The same catalyst system and conditions as in Example 3, but at 80° C., were used to prepare a propylene/ 1-butene copolymer which had a melt flow index of 10 g/10 min at 230° C. and 2.16 kg (DIN 53 735 method). The polymerized 1-butene content was 4.9% by weight. The productivity of the catalyst and the contents of chlorine and xylene-soluble substances in the propylene/1-butene copolymer according to the invention are to be found in the Table which follows.

EXAMPLE 5

The same catalyst system and identical conditions as described in Example 1 were used to polymerize a gaseous mixture of propylene, ethylene and 1-butene. The ratio of the propylene, ethylene and 1-butene partial pressures was 25:1:0.65, and the mean holdup time of the polymer was 2.7 hours.

The product from the gas-phase polymerization was a terpolymer which, besides propylene, contained 4.0% by weight ethylene and 2.6% by weight 1-butene. The melt flow index was 0.3 g/10 min at 230° C. and 2.16 kg (DIN 53 735 method). The melting point of the terpolymer was 132° C. The productivity of the catalyst and the contents of chlorine and xylene-soluble substances in the terpolymer according to the invention are to be found in the Table which follows.

EXAMPLE 6

The same catalyst system and conditions as in Example 5 were used to polymerize a gaseous mixture of propylene, ethylene and 1-butene.

The product from the gas-phase polymerization was a terpolymer which, besides propylene, contained 3.9% by weight ethylene and 2.7% by weight 1-butene. The melt flow index of the terpolymer was 0.5 g/10 min at 230° C. and 2.16 kg (DIN 53 735 method). The melting point of the terpolymer was 128° C. The productivity of the catalyst and the contents of chlorine and xylene-soluble substances in the terpolymer according to the invention are to be found in the Table which follows.

TABLE

| Example | Productivity (g polypropylene/ g titanium-containing solid component) | Bulk density* (g/l) | Chlorine content in the product (ppm) | Xylene-soluble substances in the product (% by weight) |
| --- | --- | --- | --- | --- |
| 1 | 38,500 | 350 | 6 | 6.7 |
| 2 | 34,000 | 360 | 7 | 5.3 |
| 3 | 19,000 | 440 | 13 | 2.0 |
| 4 | 15,000 | 420 | 16 | 2.3 |
| 5 | 26,100 | 360 | 9 | 9.8 |
| 6 | 23,200 | 336 | 10 | 8.9 |

*DIN 53 466 method

We claim:

1. A process for preparing a copolymer of propylene with another 1-alkene in an agitated fixed bed, which comprises gas-phase polymerizing a mixture of propylene and another 1-alkene in the absence of a liquid reaction medium under a preset pressure of from 15 to 30 bar, at from 65° to 90° C. and with an average holdup time of the polymer of from 1 to 5 hours, with the aid of a Ziegler-Natta catalyst system which contains an aluminum component and an organosilicon compound in addition to a titanium-containing solid component applied to a very finely divided carrier selected from the group consisting of silicas, aluminas and aluminum silicates of the formula $SiO_2 \cdot aAl_2O_3$, where a is from 0.01 to 2, wherein the temperature is chosen so that, under the preset pressure, no condensation of the monomer mixture takes place in the gas space and, wherein the ratio of the partial pressures of propylene and the other 1-alkene is adjusted to from 5:1 to 100:1.

2. A process as defined in claim 1, wherein the ratio of the partial pressures of propylene and the other 1-alkene in the stated process is adjusted to from 5:1 to 50:1.

3. A process as defined in claim 1, wherein ethylene is used as the 1-alkene in the stated process.

4. A process as defined in claim 1, wherein 1-butene is used as the 1-alkene in the stated process.

5. A process as defined in claim 1, wherein a mixture of ethylene and a $C_4$–$C_{10}$-1-alkene is used in the stated process and the partial pressure ratio between ethylene and the $C_4$–$C_{10}$-1-alkene therein is adjusted to from 1:1 to 100:1.

* * * * *